(12) United States Patent  
Roby et al.

(10) Patent No.: US 7,412,345 B2  
(45) Date of Patent: Aug. 12, 2008

(54) SYSTEM, METHOD, AND ARTICLE OF MANUFACTURE FOR OBTAINING DATA

(75) Inventors: Scott Roby, Minden, NV (US); Yu Ho Chong, Reno, NV (US)

(73) Assignee: General Electric Company, Schenectady, NY (US)

( * ) Notice: Subject to any disclaimer, the term of this patent is extended or adjusted under 35 U.S.C. 154(b) by 911 days.

(21) Appl. No.: 10/709,619

(22) Filed: May 18, 2004

(65) Prior Publication Data

US 2006/0079967 A1   Apr. 13, 2006

(51) Int. Cl.
*G06F 19/00* (2006.01)

(52) U.S. Cl. ..................................... 702/127
(58) Field of Classification Search ................ 702/127, 702/182–185, 188, 189, 76; 324/76.11
See application file for complete search history.

(56) References Cited

U.S. PATENT DOCUMENTS 5,836,982 A * 11/1998 Muhlenberg et al. ........... 607/9
2004/0082083 A1   4/2004 Kraz et al. .................... 438/14

* cited by examiner

*Primary Examiner*—Edward Raymond
(74) *Attorney, Agent, or Firm*—Cantor Colburn LLP

(57) ABSTRACT

A system and method for obtaining data is provided. The method includes receiving a first plurality of data sample values based on a first signal generated by a first sensor from a first predetermined time to a second predetermined time. The method further includes receiving a second plurality of data sample values based on a second signal generated by a second sensor from a third predetermined time to a fourth predetermined time. Finally, the method includes storing both the first plurality of data sample values and the second plurality of data sample values in a first memory when a time difference between the first predetermined time and the third predetermined time is less than a predetermined time threshold value.

14 Claims, 8 Drawing Sheets

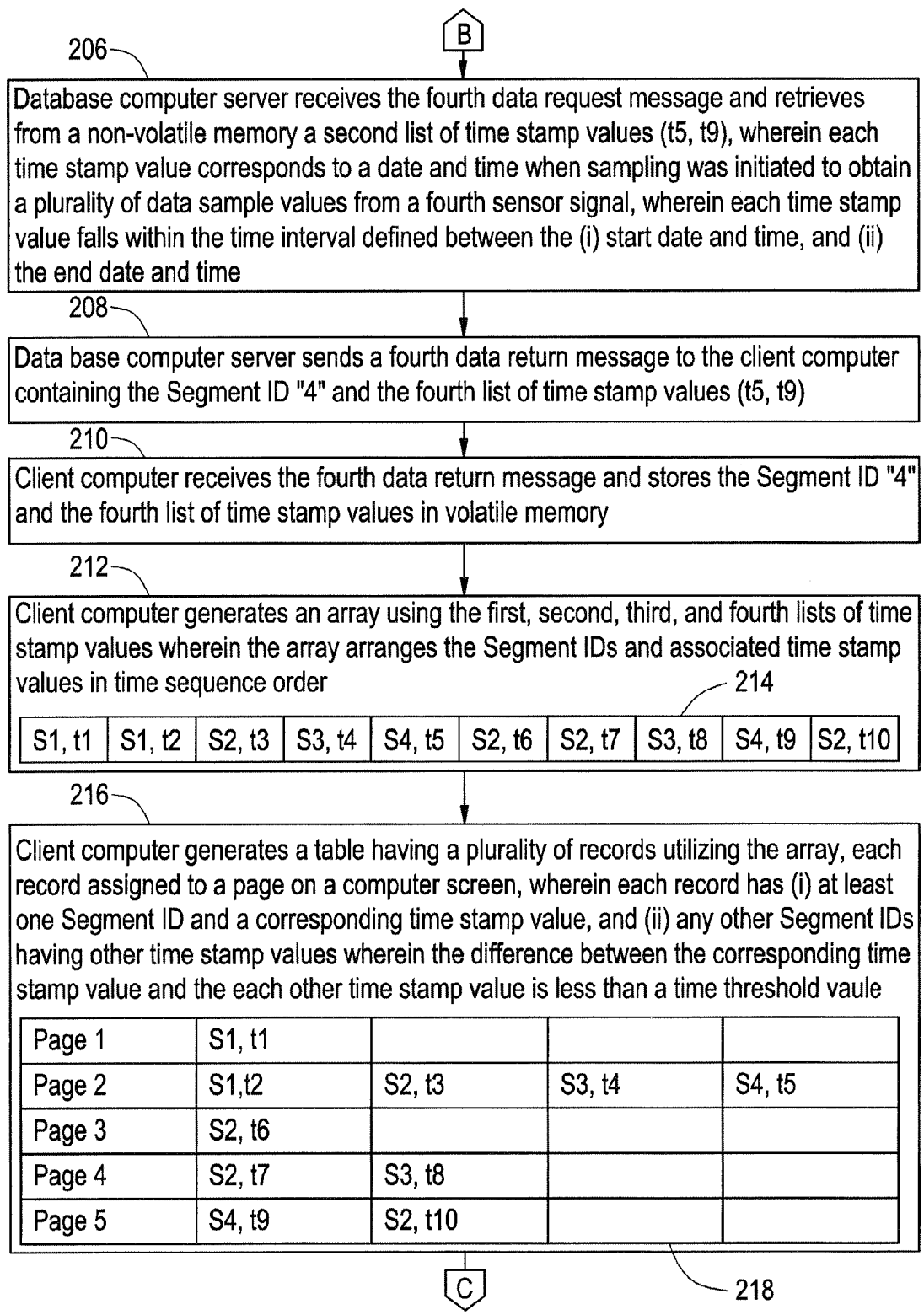

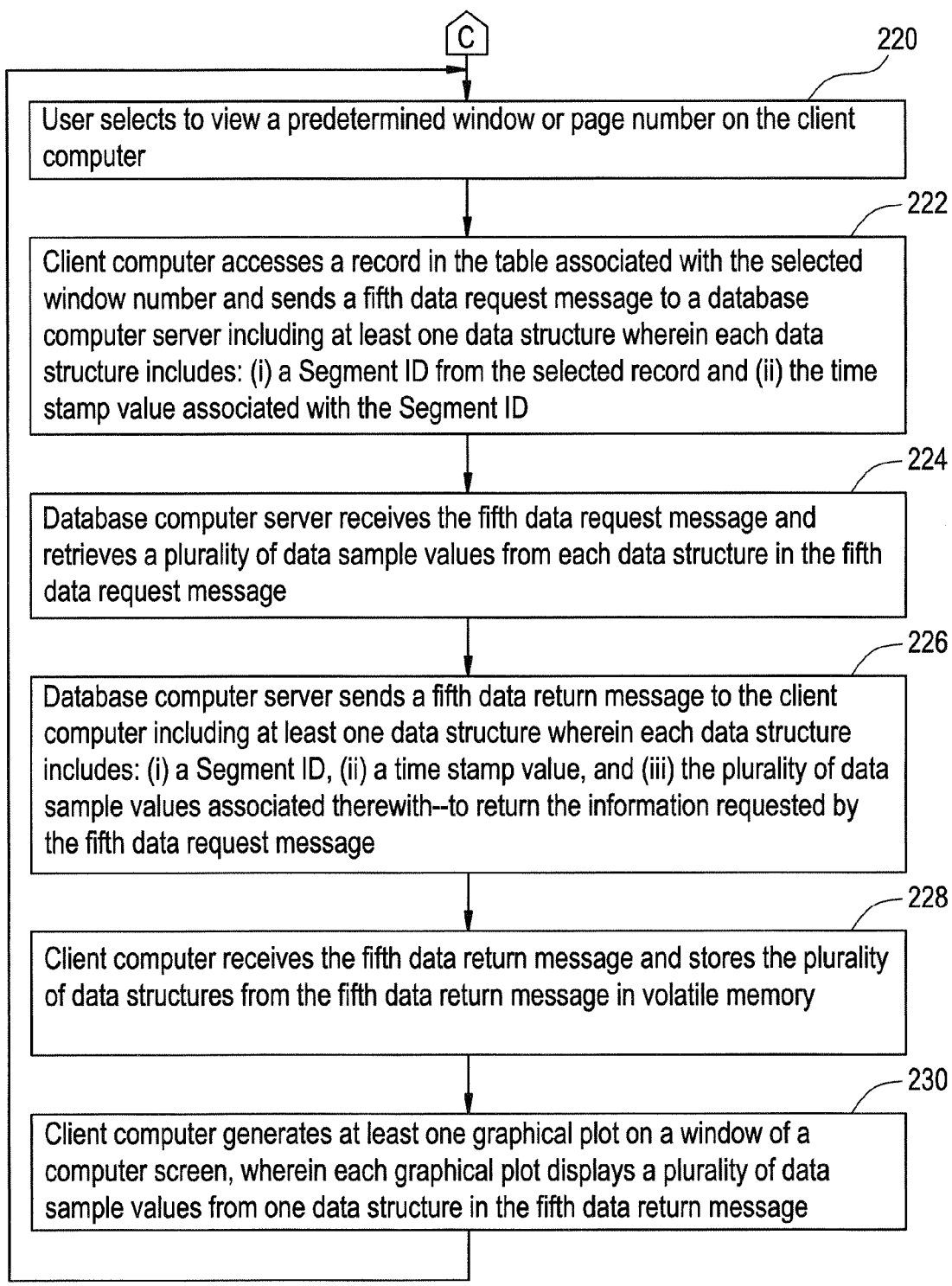

SYSTEM, METHOD, AND ARTICLE OF MANUFACTURE FOR OBTAINING DATA

BACKGROUND OF INVENTION

Facility monitoring systems have been developed which display data collected from a plurality of sensors disposed in a manufacturing facility. A user of a facility monitoring system may want to compare data generated from two or more sensors to determine whether devices or machines in the facility are operating correctly. To allow the comparison of data from two sensors, for example, the facility monitoring system can obtain a first set of measured values from a first sensor and a second set of measured values from a second sensor. Thereafter, the system can display the first and second sets of measured values on a computer monitor.

Generally, when comparing a first set of measured values to a second set of measured values, a meaningful comparison can only be obtained when the first and second sets of measured values are obtained over a common time interval and at a common sampling frequency. However, facility-monitoring systems can often generate the first and second sets of data over differing time intervals. For example, the system could generate the first set of measured values starting at 7:00 P.M. on a specific day and generate the second set of measured values starting at 8:00 A.M. on the same day. Thus, comparison of these two sets of measured values obtained over differing time intervals would not be useful when attempting to determine the operating status of a device or machine.

Thus, a need exists for a system and method that can obtain, store and display both the first and second sets of measured values from first and second sensors, respectively, for comparison when the first and second sets of measured values were generated at a substantially similar time interval.

SUMMARY OF INVENTION

A method for obtaining data in a computer system is provided. The method includes receiving a first plurality of data sample values based on a first signal generated by a first sensor from a first predetermined time to a second predetermined time. The method further includes receiving a second plurality of data sample values based on a second signal generated by a second sensor from a third predetermined time to a fourth predetermined time. Finally, the method includes storing both the first plurality of data sample values and the second plurality of data sample values in a first memory when a time difference between the first predetermined time and the third predetermined time is less than a predetermined time threshold value.

A system for obtaining data is provided. The system includes first and second computers operably communicating with one another. The first computer is configured to retrieve a first plurality of data sample values stored in the second computer. The first plurality of data sample values are determined based on a first signal generated by a first sensor from a first predetermined time to a second predetermined time. The first computer is further configured to retrieve a second plurality of data sample values stored in the second computer. The second plurality of data sample values are determined based on a second signal generated by a second sensor from a third predetermined time to a fourth predetermined time. The first computer is further configured to store both the first plurality of data sample values and the second plurality of data sample values in a first memory when a time difference between the first predetermined time and the third predetermined time is less than a predetermined time threshold value.

A system for obtaining data is provided. The system includes a first computer means for storing a first plurality of data sample values based on a first signal generated by a first sensor from a first predetermined time to a second predetermined time and for storing a second plurality of data sample values based on a second signal generated by a second sensor from a third predetermined time to a fourth predetermined time. Finally, the system includes a second computer means operably communicating with the first computer means for storing both the first plurality of data sample values and the second plurality of data sample values in a first memory when a time difference between the first predetermined time and the third predetermined time is less than a predetermined time threshold value.

An article of manufacture having a computer storage medium with a computer program encoded therein for obtaining data in a computer system is provided. The computer storage medium includes code for receiving a first plurality of data sample values based on a first signal generated by a first sensor from a first predetermined time to a second predetermined time. The computer storage medium further includes code for receiving a second plurality of data sample values based on a second signal generated by a second sensor from a third predetermined time to a fourth predetermined time. Finally, the computer storage medium includes code for storing both the first plurality of data sample values and the second plurality of data sample values in a first memory when a time difference between the first predetermined time and the third predetermined time is less than a predetermined time threshold value.

Other systems and/or methods according to the embodiments will become or are apparent to one with skill in the art upon review of the following drawings and detailed description. It is intended that all such additional systems and methods be within the scope of the present invention, and be protected by the accompanying claims.

BRIEF DESCRIPTION OF DRAWINGS

FIGS. 6-9 are flowcharts of a method for obtaining, storing, and displaying data in the facility monitoring system of FIG. 1.

DETAILED DESCRIPTION

Figure 1:
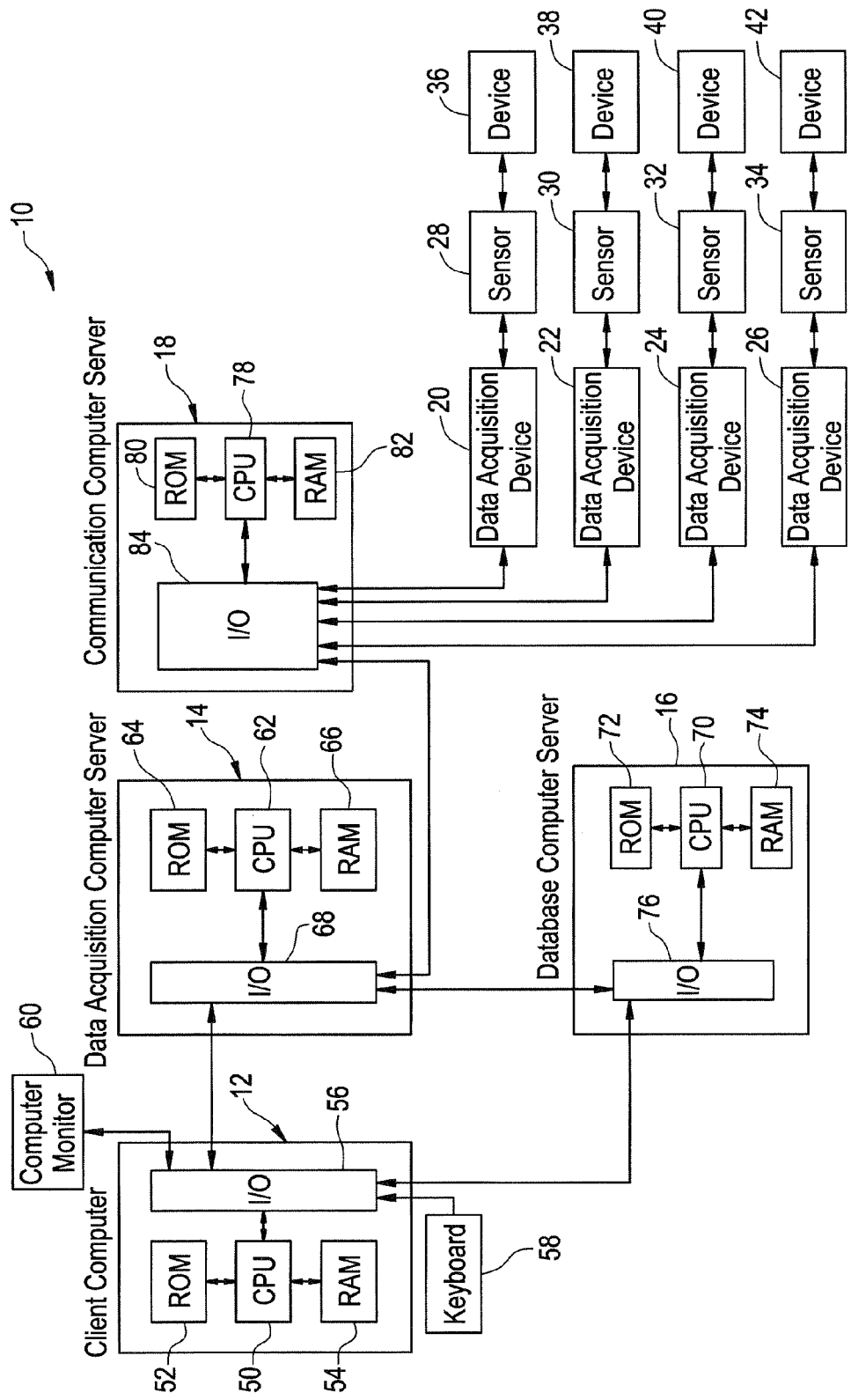
FIG. 1 illustrates a facility monitoring system having a client computer, a database computer server, a data acquisition computer server, and a communication computer server.

Referring to FIG. 1, a facility monitoring system 10 is illustrated that can display data sets associated with sensors in a manufacturing facility.

As shown, the system 10 includes the client computer 12, the data acquisition computer server 14, the database computer server 16, the communication computer server 18, data acquisition devices 20, 22, 24, 26, sensors 28, 30, 32, 34, and devices 36, 38, 40, and 42.

The communication computer server 18 is provided to receive a plurality of data samples from each of the data acquisition devices and to transmit each of the plurality of data samples to the data acquisition computer server 14. As shown, the communication computer server 18 includes a central processing unit (CPU) 78, a non-volatile memory such as a read-only memory (ROM) 80, a volatile memory such as a random access memory (RAM) 82, and an input/output (I/O) interface 84. The CPU 78 operably communicates with the ROM 80, the RAM 82, and the I/O interface 84. The computer readable media including ROM 80 and RAM 82 may be implemented using any of a number of known memory devices such as PROMs, EPROMs, EEPROMS, flash memory or any other electric, magnetic, optical or combination memory device capable of storing data, some of which represent executable instructions used by the CPU 78. The CPU 78 communicates via the I/O interface 84 with the database computer server 16 and the data acquisition devices 20, 22, 24, and 26. A computer is defined as any device that can perform a calculation.

The data acquisition device 20 is operably coupled to a sensor 28 that measures an operating parameter associated with the device 36. The data acquisition device 20 periodically generates a first plurality of data sample values based upon a signal generated by the sensor 28. Thereafter, the data acquisition device 20 transmits the first plurality of data sample values to the communication computer server 18. Thereafter, the communication computer server 18 transmits the first plurality of data sample values and a time stamp value associated with the first plurality of data sample values to the data acquisition computer server 14.

Each time stamp value corresponds to an initial date and time when a first sampled value in a plurality of sample values was obtained by a data acquisition device. For example, when a data acquisition device samples a signal from a sensor starting at Feb. 18, 2004 at 7 p.m. and ends the sampling of the signal at Feb. 18, 2004 at 7:01 p.m., the plurality of sampled data values would be assigned a time stamp value corresponding to Feb. 18, 2004 at 7 p.m. For purposes of discussion hereinafter, each time stamp value will be represented by the letter "t" followed by an integer value. For example, a first time stamp value will be represented as "t1." A second time stamp value having a date and time following the first time stamp value will be represented as "t2."

The data acquisition device 22 is operably coupled to a sensor 30 that measures an operating parameter associated with the device 38. The data acquisition device 22 periodically generates a second plurality of data sample values based upon a signal generated by the sensor 30. Thereafter, the data acquisition device 22 transmits the second plurality of data sample values to the communication computer server 18. Thereafter, the communication computer server 18 transmits the second plurality of data sample values and a time stamp value associated with the second plurality of data sample values to the data acquisition computer server 14.

The data acquisition device 24 is operably coupled to a sensor 32 that measures an operating parameter associated with the device 40. The data acquisition device 24 periodically generates a third plurality of data sample values based upon a signal generated by the sensor 32. Thereafter, the data acquisition device 24 transmits the third plurality of data sample values to the communication computer server 18. Thereafter, the communication computer server 18 transmits the third plurality of data sample values and a time stamp value associated with the third plurality of data sample values to the data acquisition computer server 14.

The data acquisition device 26 is operably coupled to a sensor 34 that measures an operating parameter associated with the device 42. The data acquisition device 26 periodically generates a fourth plurality of data sample values based upon a signal generated by the sensor 34. Thereafter, the data acquisition device 26 transmits the fourth plurality of data sample values to the communication computer server 18. Thereafter, the communication computer server 18 transmits the fourth plurality of data sample values and a time stamp value associated with the fourth plurality of data sample values to the data acquisition computer server 14.

The data acquisition computer server 14 is provided to obtain data sample values associated with a plurality of sensors from the communication computer server 18. In particular, the data acquisition computer server 14 requests or "polls" sample values from the communication computer server 18 which were previously received from a plurality of data acquisition devices. When the computer server 14 receives a plurality of data sample values from server 18, server 14 stores a record in RAM 66 having the following attributes: (i) a Segment ID, (ii) time stamp value, and (iii) data sample values. Each Segment ID is a unique number that identifies to a predetermined sensor. For example, the sensor 28 has a Segment ID having a value of "1", the sensor 30 has a Segment ID having a value of "2", the sensor 32 has a Segment ID having a value of "3", and the sensor 34 has a Segment ID having a value of "4". Thus, for example, the data acquisition computer server 14 can receive a plurality of data sample values related to sensor 28 and thereafter store a record in RAM 66 having: (i) a Segment ID "1" corresponding to the sensor 28, (ii) a time stamp value t1, and (iii) a plurality of data sample values. Further, for example, the data acquisition computer server 14 can periodically request a plurality of data sample values from the other sensors and store the corresponding data sample values in RAM 66. Further, the data acquisition computer server 14 periodically transmits data return records associated with each Segment ID to the database computer server 16 wherein each data return record includes: (i) a Segment ID, (ii) a time stamp value, and (iii) the data sample values associated with a sensor.

As shown, the data acquisition computer server 14 includes a CPU 62, a non-volatile memory such as a ROM 64, a volatile memory such as a RAM 66 and an I/O interface 68. The CPU 62 operably communicates with the ROM 64, the RAM 66, and the I/O interface 68. The computer readable media including ROM 64 and RAM 66 may be implemented using any of a number of known memory devices such as PROMs, EPROMs, EEPROMS, flash memory or any other electric, magnetic, optical or combination memory device capable of storing data, some of which represent executable instructions used by CPU 62. The CPU 62 communicates via the I/O interface 68 with the client computer 12, the database computer server 16, and the communication computer server 18.

The database computer server 16 is provided to periodically receive data return messages sent from the data acquisition computer server 14 wherein each data return message includes: (i) a Segment ID associated with a sensor, (ii) a time stamp value, and (iii) the data sample values associated with a sensor. Upon receipt of a data return message, the database computer server 16 stores the information in non-volatile ROM 72. The database computer server 16 is further provided to receive data request messages from the client computer 12 requesting predetermined data sample values and then returning the requested data sample values to the client computer 12. For example, when database computer server 16 receives a data request message including (i) a Segment ID, (ii) a start date and time, and (iii) an end date and time, server 16 searches the records stored in ROM 72 having the Segment ID and a time stamp value falling within the requested time interval (e.g., start date and time to end date and time). Thereafter, the database computer server 16 sends a data return message including a (i) the Segment ID, (ii) a time stamp value, and (iii) a plurality of data sample values associated with the Segment ID.

As shown, the database computer server 16 includes a CPU 70, a non-volatile memory such as ROM 72, a volatile memory such as RAM 74 and an I/O interface 76. The CPU 70 operably communicates with the ROM 72, the RAM 74, and the I/O interface 76. The computer readable media including ROM 72 and RAM 74 may be implemented using any of a number of known memory devices such as PROMs, EPROMs, EEPROMS, flash memory or any other electric, magnetic, optical or combination memory device capable of storing data, some of which represent executable instructions used by CPU 70. The CPU 70 communicates via the I/O interface 76 with the client computer 12 and the data acquisition computer server 14.

Referring to FIG. 1, the client computer 12 is provided to request data sample values (e.g. measured values) from the database computer server 16 associated with sensors 28, 30, 32, 34. In particular, the client computer 12 can generate a data request message to request data sample values relating to one or more of sensors 28, 30, 32, 34 that is transmitted to the database computer server 16. Each data request message can include the following attributes: (i) a Segment ID, (ii) start date and time, (iii) end date and time. As discussed above, the "start date and time" attributes and the "end date and time" attributes define a time interval used for selecting data sample values associated with the identified sensors.

Further, the client computer 12 is configured to receive a data return message from the database computer server 16 containing the requested data sample values. Further, the client computer is configured to display one or more plurality of data sample values that were obtained over a similar time interval on a computer monitor 60 to allow a user to compare the one or more plurality of data sample values. To accomplish this, the client computer 12 selects those time stamp values in received data return messages that are within a predetermined threshold time value and then displays each of the plurality of data samples associated with the selected time stamp values.

Figure 2:
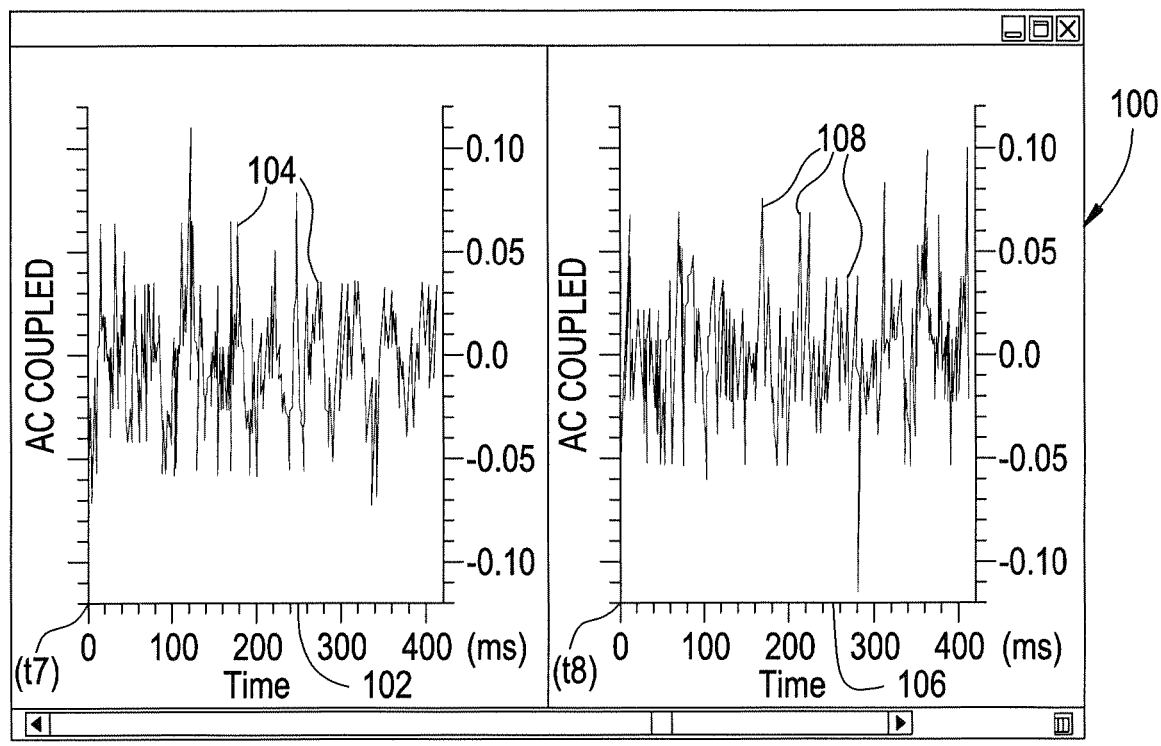
FIG. 2 depicts two data plots from two sensors.

For example, referring to FIG. 2, the client computer 12 can display two data plots having time stamp values (t7) and (t8) that have a time difference less than a predetermined time threshold value. In particular, the client computer 12 generates a window 100 on computer monitor 60 including a data plot 102 having a plurality of data sample values 104 obtained from sensor 30 (identified by Segment ID "2") and having the time stamp value (t7). Further, the computer 12 generates a data plot 106 corresponding to a plurality of data sample values 108 generated by the sensor 32 (identified by Segment ID "3") having the time stamp value (t8). The client computer 12 displays both the plurality of data samples 104 and the plurality of data samples 108 because the time stamp value (t7) is within a predetermined threshold value from the time stamp value (t8).

Figure 4:
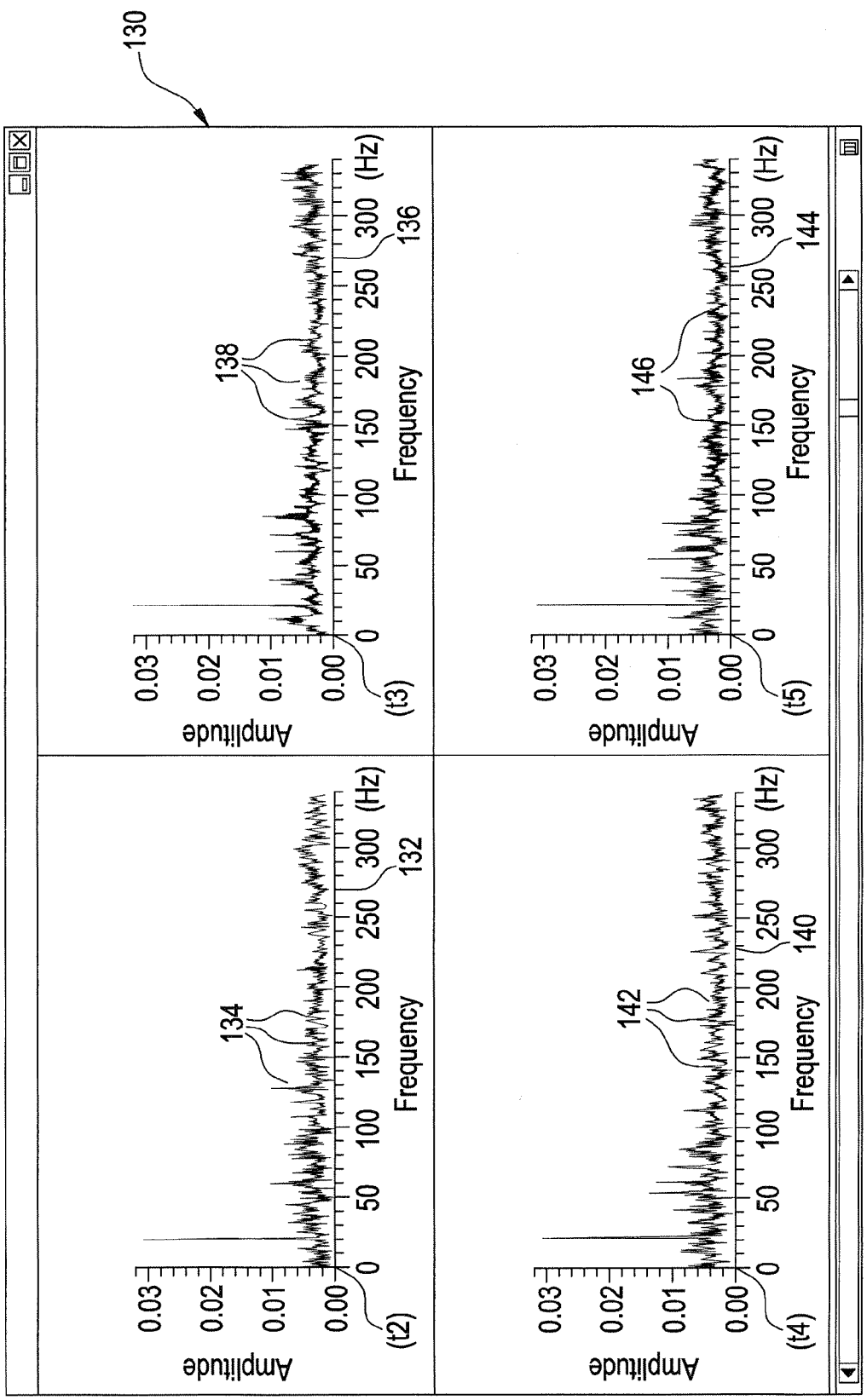
FIG. 4 depicts for four data plots from four sensors.

For example, referring to FIG. 4, the client computer 12 can display four data plots having time stamp values (t2), (t3), (t4), (t5) that have a time difference less than a predetermined time threshold value. In particular, the client computer 12 generates a window 130 on computer monitor 60 including a data plot 132 having a plurality of data sample values 134 obtained from sensor 28 (identified by Segment ID "1") and having the time stamp value (t2). Further, the computer 12 generates a data plot 136 corresponding to a plurality of data sample values 138 generated by the sensor 30 (identified by Segment ID "2") having the time stamp value (t3). Further, the computer 12 generates a data plot 140 corresponding to a plurality of data sample values 142 generated by the sensor 32 (identified by Segment ID "3") having the time stamp value (t4). Still further, the computer 12 generates a data plot 144 corresponding to a plurality of data sample values 146 generated by the sensor 34 (identified by Segment ID "4") having the time stamp value (t5). The client computer 12 displays the four plurality of data samples because the time stamp values (t3), (t4), (t5) are within a predetermined time threshold value from the time stamp value (t2).

Figure 3:
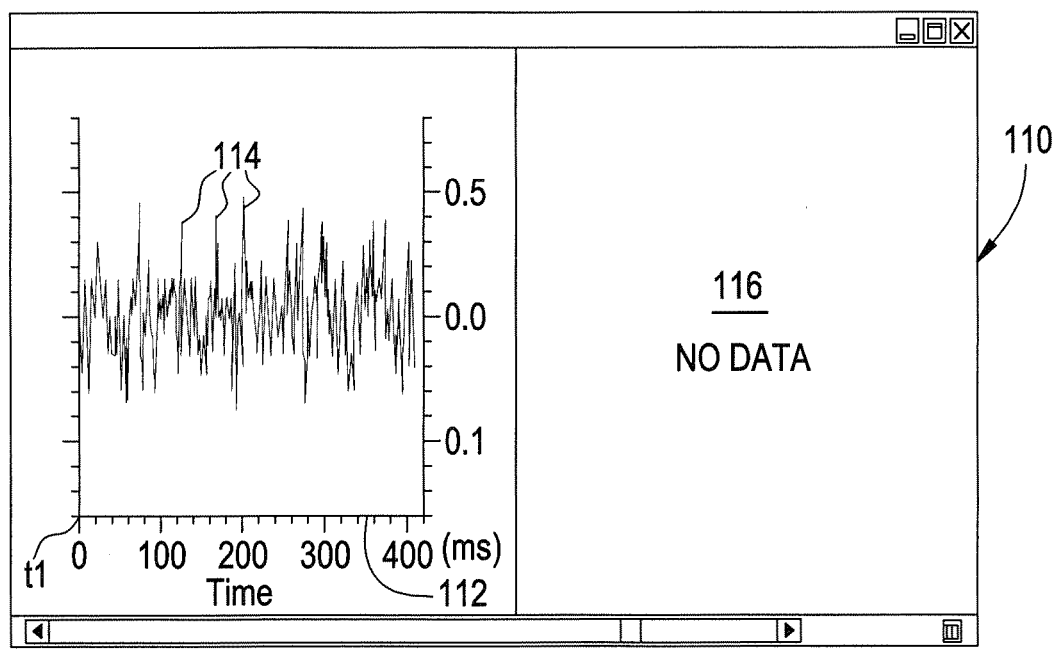
FIG. 3 depicts a single data plot from a single sensor.

Referring to FIG. 3, the client computer 12 can also display only one plurality of data sample values when no other time stamp value associated with other sensors is within a predetermined time threshold value from the time stamp value (t1). For example, the client computer 12 can generate a window 110 on the computer monitor 60 that includes only a data plot 112 having a plurality of data sample values 114 obtained from sensor 28 (identified by Segment ID "1") having the time stamp value (t1).

Figure 5:
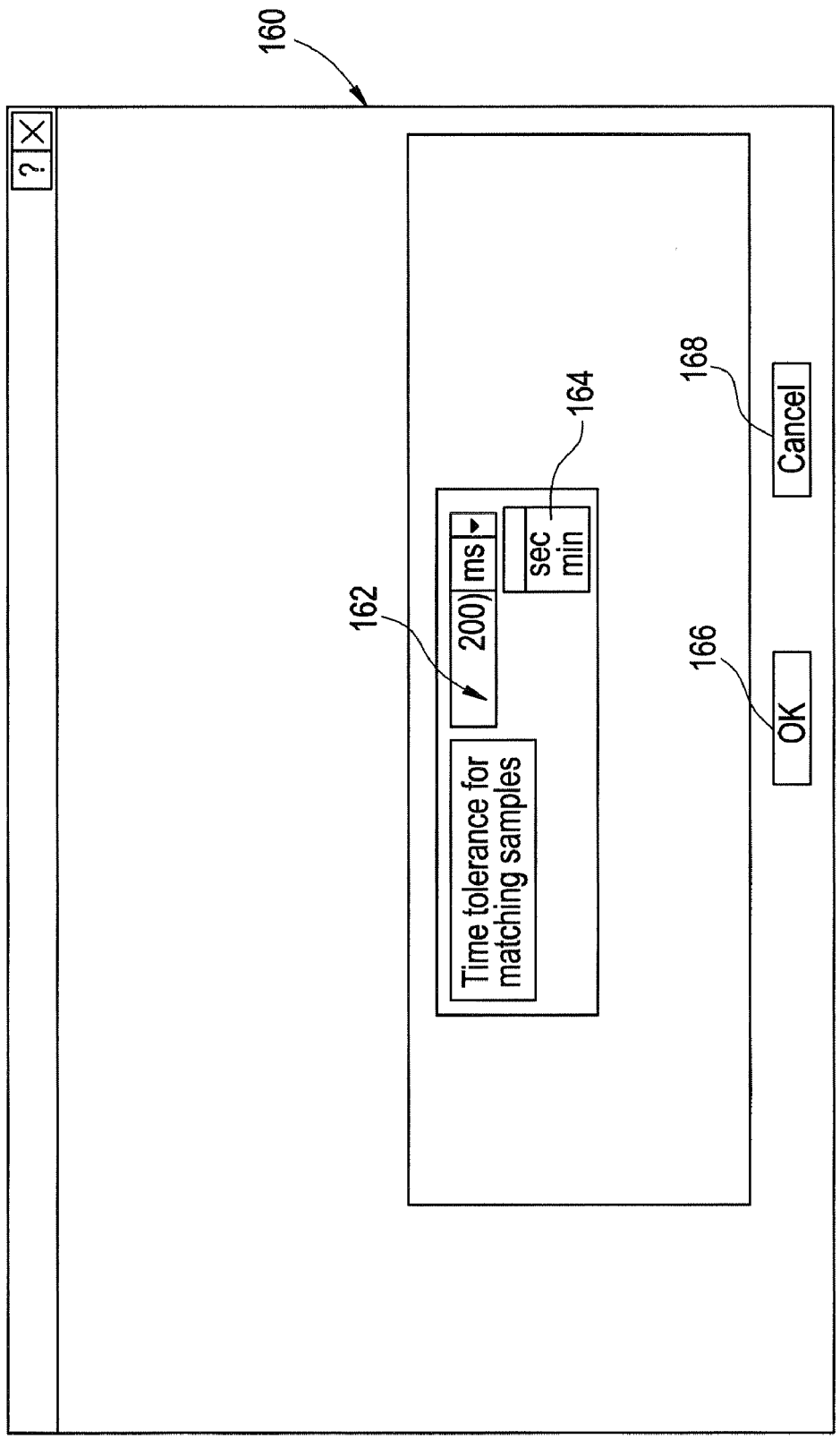
FIG. 5 depicts a data input window for inputting a time threshold value.
Figure 6:
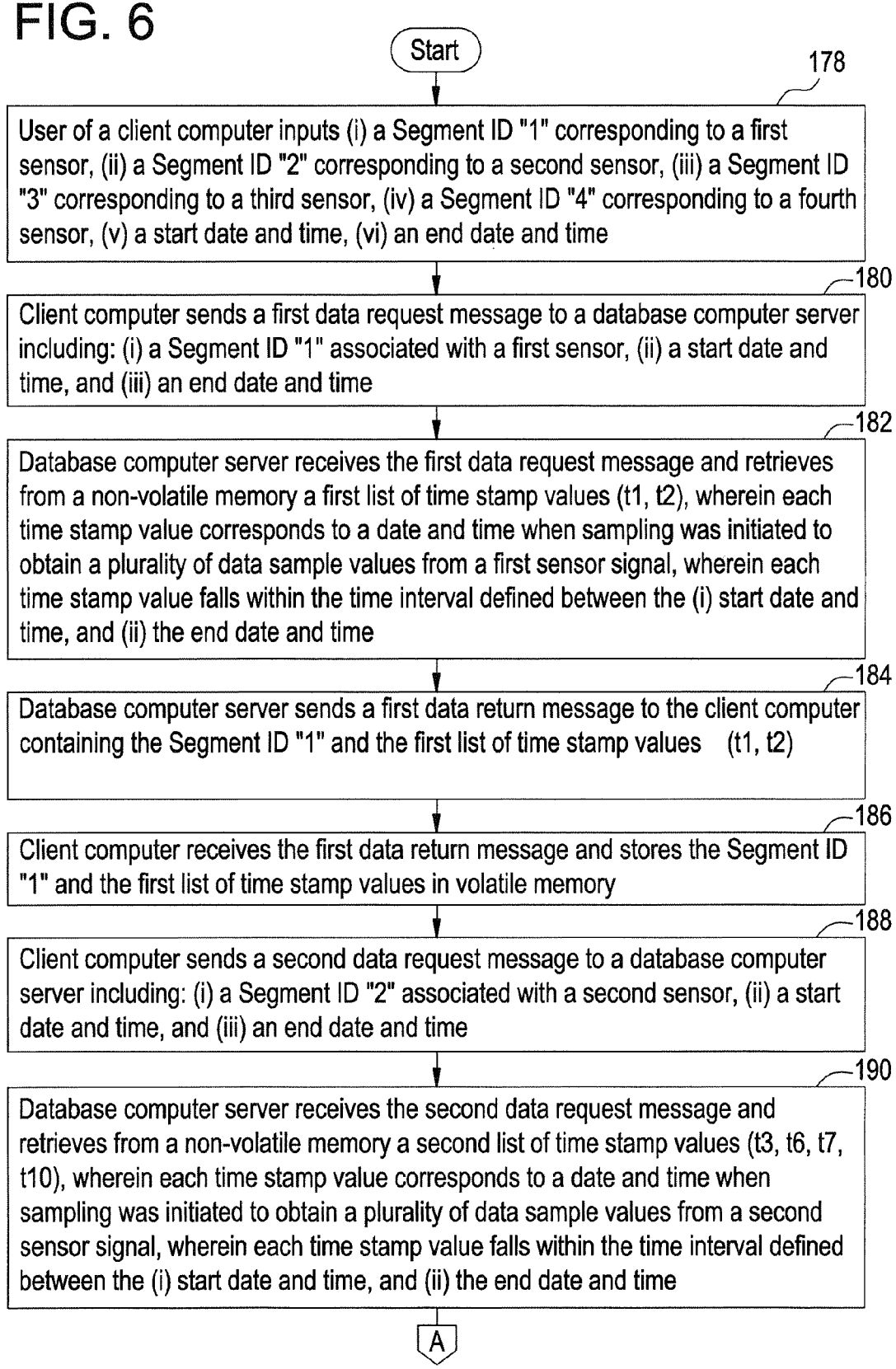
Figure 7:
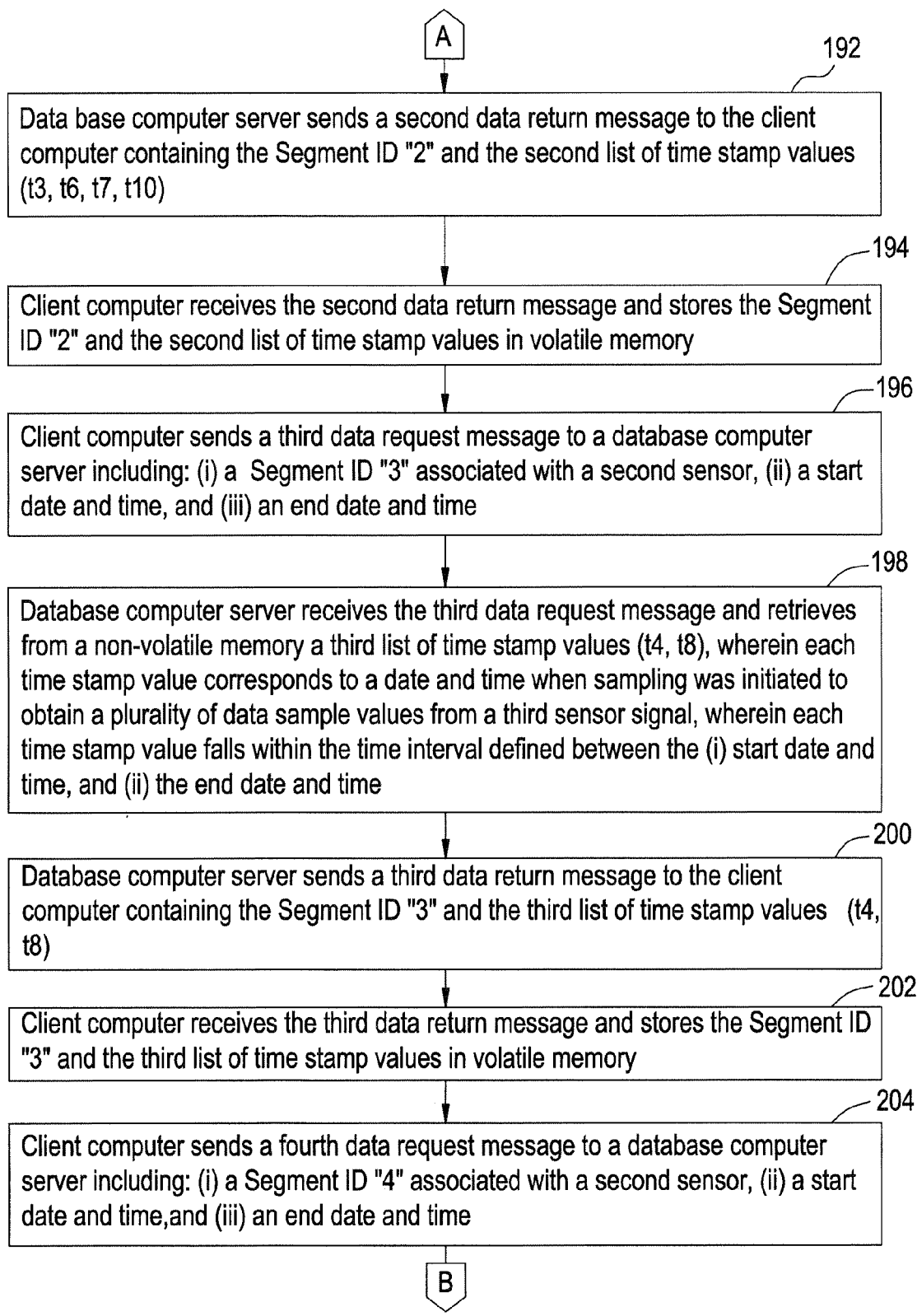

Referring to FIG. 5, a user of the client computer 12 can input a time threshold value using the input box 162 and can then select the time units associated with the time threshold value using the pull-down menu 164. Thereafter, a user can select the icon 166 to store the inputted time threshold value in ROM 52 or can select the icon 168 to cancel the selection.

As shown, the client computer 12 includes a CPU 50, a non-volatile memory such as a ROM 52, a volatile memory such as a RAM 54 and an I/O interface 56. The CPU 50 operably communicates with the ROM 52, the RAM 54, and the I/O interface 56. The computer readable media including ROM 52 and RAM 54 may be implemented using any of a number of known memory devices such as PROMs, EPROMs, EEPROMS, flash memory or any other electric, magnetic, optical or combination memory device capable of storing data, some of which represent executable instructions used by the CPU 50. The CPU 50 communicates via the I/O interface 56 with a keyboard 58, the computer monitor 60, the database computer server 16, and the data acquisition computer server 14.

Referring to FIGS. 6-9, a method for organizing and displaying data in the computer system will now be explained. It should be noted that the following method will be utilized with data sample values being obtained at a common sampling frequency.

At step 178, a user of a client computer inputs (i) a Segment ID "1" corresponding to the sensor 28, (ii) a Segment ID "2" corresponding to the sensor 30, (iii) a Segment ID "3" corresponding to the sensor 32, (iv) a Segment ID "4" corresponding to the sensor 34, (v) a start date and time, and (vi) an end date and time.

At step 180, the client computer 12 sends a first data request message to the database computer server 16 including: (i) a Segment ID "1" associated with sensor 28, (ii) a start date and time, and (iii) an end date and time.

At step 182, the database computer server 16 receives the first data request message and retrieves from ROM 72 a first list of time stamp values (t1, t2), wherein each time stamp value corresponds to a date and time when sampling was initiated to obtain the plurality of data sample values from a signal generated by sensor 28, wherein each time stamp value falls within the time interval defined between the (i) start date and time, and (ii) the end date and time.

At step 184, the database computer server 16 sends a first data return message to the client computer 12 containing the Segment ID "1" and the first list of time stamp values (t1, t2).

At step 186, the client computer 12 receives the first data return message and stores the Segment ID "1" and the first list of time stamp values in RAM 54.

At step 188, the client computer 12 sends a second data request message to the database computer server 16 including: (i) a Segment ID "2" associated with the sensor 30, (ii) a start date and time, and (iii) an end date and time.

At step 190, the database computer server 16 receives the second data request message and retrieves from ROM 72 for a second list of time stamp values (t3, t6, t7, t10), wherein each time stamp value corresponds to a date and time when sampling was initiated to obtain a plurality of data sample values from a signal generated by sensor 30, wherein each time stamp value falls within the time interval defined between the (i) start date and time, and (ii) the end date and time.

At step 192, the database computer server 16 sends a second data return message to the client computer 12 containing the Segment ID "2" and the second list of time stamp values (t3, t6, t7, t10).

At step 194, the client computer 12 receives the second data return message and stores the Segment ID "2" and the second list of time stamp values in RAM 54.

At step 196, the client computer 12 sends a third data request message to a database computer server 16 including: (i) a Segment ID "3" associated with sensor 32, (ii) a start date and time, and (iii) an end date and time.

At step 198, the database computer server 16 receives the third data request message and retrieves from RAM 74 a third list of time stamp values (t4, t8), wherein each time stamp value corresponds to a date and time when sampling was initiated to obtain a plurality of data sample values from a signal generated by sensor 32, wherein each time stamp value falls within the time interval defined between the (i) start date and time, and (ii) the end date and time.

At step 200, the database computer server 16 sends a third data return message to the client computer 12 containing the Segment ID "3" and the third list of time stamp values (t4, t8).

At step 202, the client computer 12 receives the third data return message and stores the Segment ID "3" and the third list of time stamp values in RAM 54.

At step 204, the client computer 12 sends a fourth data request message to a database computer server 16 including: (i) a Segment ID "4" associated with sensor 34, (ii) a start date and time, and (iii) an end date and time.

At step 206, the database computer server 16 receives the fourth data request message and retrieves from a ROM 72 a second list of time stamp values (t5, t9), wherein each time stamp value corresponds to a date and time when sampling was initiated to obtain a plurality of data sample values from a signal generated by sensor 34, wherein each time stamp value falls within the time interval defined between the (i) start date and time, and (ii) the end date and time.

At step 208, the database computer server 16 sends a fourth data return message to the client computer 12 containing the Segment ID "4" and the fourth list of time stamp values (t5, t9).

At step 210, the client computer 12 receives the fourth data return message and stores the Segment ID "4" and the fourth list of time stamp values in RAM 54.

At step 212, the client computer 12 generates an array 214 using the first, second, third, and fourth lists of time stamp values wherein the array 214 lists the Segment IDs and associated time stamp values in time sequence order.

At step 216, the client computer 12 generates a table 218 having a plurality of records utilizing the array 214, each record assigned to a predetermined page or window on a computer screen, wherein each record has (i) at least one Segment ID and a corresponding time stamp value, and (ii) any other Segment IDs having other time stamp values wherein the difference between the corresponding time stamp value and the each other time stamp value is less than a time threshold value.

At step 220, the user selects to view a predetermined window number on the client computer 12.

At step 222, the client computer 12 accesses a record in the table 218 associated with the selected window number and sends a fifth data request message to a database computer server 16 including at least one data structure, wherein each data structure includes: (i) a Segment ID from the selected record, and (ii) the time stamp value associated with the Segment ID.

At step 224, the database computer server 16 receives the fifth data request message and retrieves a plurality of data sample values from each data structure in the fifth data request message.

At step 226, the database computer server 16 sends a fifth data return message to the client computer 12 including at least one data structure wherein each data structure includes: (i) a Segment ID, (ii) a time stamp value, and (iii) the plurality of data sample values associated therewith—to return the information requested by the fifth data request message.

At step 228, the client computer 12 receives the fifth data return message and stores the plurality of data structures from the fifth data return message in RAM 54.

At step 230, the client computer 12 generates at least one graphical plot on a window of a computer monitor 60, wherein each graphical plot displays a plurality of data sample values from one data structure in the fifth data return message. After step 230, the method advances back to step 220.

The system and method for obtaining, storing, and displaying data in accordance with exemplary embodiments provides a substantial advantage over known systems and methods. In particular, the system and method provides a technical effect of obtaining, storing, and displaying both the first and second sets of measured values obtained from first and second sensors, respectively, for comparison when the first and second sets of measured values have associated time stamp values within a time threshold value from one another.

As described above, the present invention can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and/or executed by a computer, the computer becomes an apparatus for practicing the invention. When implemented on a general-purpose microprocessor, the computer program code segments configure the microprocessor to create specific logic circuits.

While the invention is described with reference to an exemplary embodiment, it will be understood by those skilled in the art that various changes may be made and equivalence may be substituted for elements thereof without departing from the scope of the invention. In addition, many modifications may be made to the teachings of the invention to adapt to a particular situation without departing from the scope thereof. Therefore, it is intended that the invention not be limited to the embodiment disclosed for carrying out this invention, but that the invention includes all embodiments falling within the scope of the intended claims. Moreover, the use of the term's first, second, etc. does not denote any order of importance, but rather the term's first, second, etc. are used to distinguish one element from another.

We claim:

1. A method for obtaining data in a computer system, comprising:
    inputting first and second identifier values associated with the first and second, respectively, using an input device operably coupled to a first computer;
    sending a first request message having the first identifier value from the first computer to a second computer to retrieve a first plurality of data sample values previously stored in the second computer, the first plurality of data sample values based on a first signal generated by a first sensor from a first predetermined time to a second predetermined time;
    sending the first plurality of data sample values from the second computer to the first computer in response to the first data request message;
    sending a second data request message having the second identifier value from the first computer to the second computer to retrieve a second plurality of data sample values previously stored in the second computer, the second plurality of data sample values based on a second signal generated by a second sensor from a third predetermined time to a fourth predetermined time;
    sending the second plurality of data sample values from the second computer to the first computer in response to the second data request message;
    determining a time difference between the first predetermined time and the third predetermined time; and
    storing both the first plurality of data sample values and the second plurality of data sample values in a first memory of the first computer when the time difference between the first predetermined time and the third predetermined time is less than a predetermined time threshold value.

2. The method of claim 1 further comprising displaying both the first plurality of data sample values and the second plurality of data sample values on a computer monitor associated with the first computer when the time difference between the first predetermined time and the third predetermined time is less than the predetermined time threshold value.

3. The method of claim 1 further comprising inputting the predetermined time threshold value using the input device operably coupled to the first computer.

4. The method of claim 1 further comprising displaying the first and second plurality of data sample values in first and second graphical plots, respectively, on a computer monitor operably coupled to the first computer.

5. The method of claim 4 further comprising:
    assigning a first time stamp value to the first plurality of data sample values, the first time stamp value corresponding to the first predetermined time; and,
    assigning a second time stamp value to the second plurality of data sample values, the second time stamp value corresponding to the second predetermined time.

6. The method of claim 5 wherein displaying the first and second plurality of data sample values comprises:
    determining the time difference value by subtracting the first time stamp value from the second time stamp value;
    generating the first graphical plot of the first plurality of data sample values on the computer monitor if the time difference value is less than the predetermined time threshold value; and,
    generating the second graphical plot of the second plurality of data sample values on the computer monitor if the time difference value is less than the predetermined time threshold value.

7. The method of claim 1 further comprising:
    sending a third data request message having the first identifier value from the first computer to the second computer to retrieve a third plurality of data sample values previously stored in the second computer, the third plurality of data sample values based on the first signal generated by the first sensor from a fifth predetermined time to a sixth predetermined time;
    sending the third plurality of data sample values from the second computer to the first computer in response to the third data request message;
    sending a fourth data request message having the second identifier value from the first computer to the second computer to retrieve a fourth plurality of data sample values previously stored in the second computer, the fourth plurality of data sample values based on the second signal generated by the second sensor from a seventh predetermined time to an eighth predetermined time;
    sending the fourth plurality of data sample values from the second computer to the first computer in response to the fourth data request message;
    determining a time difference between the fifth predetermined time and the seventh predetermined time; and
    storing both the third plurality of data sample values and the fourth plurality of data sample values in the first memory when the time difference between the fifth predetermined time and the sixth predetermined time is less than the predetermined time threshold value.

8. A system for obtaining data in a computer system, comprising:
    first and second computers operably communicating with one another;
    the first computer configured to receive first and second identifier values associated with the first and second sensors, respectively, from an input device operably coupled to the first computer;
    the first computer further configured to send a first data request message having the first identifier value to the second computer to retrieve a first plurality of data sample values previously stored in the second computer, the first plurality of data sample values based on a first signal generated by a first sensor from a first predetermined time to a second predetermined time;
    the second computer configured to send the first plurality of data sample values to the first computer in response to the first data request message;
    the first computer further configured to send a second data request message having the second identifier value to the second computer to retrieve a second plurality of data sample values previously stored in the second computer, the second plurality of data sample values based on a second signal generated by a second sensor from a third predetermined time to a fourth predetermined time;
    the second computer further configured to send the second plurality of data sample values to the first computer in response to the second data request message;

the first computer further configured to determine a time difference between the first predetermined time and the third predetermined time; and the first computer further configured to store both the first plurality of data sample values and the second plurality of data sample values in a first memory of the first computer when the time difference between the first predetermined time and the third predetermined time less than a predetermined time threshold value.

9. The system of claim 8 wherein the first computer is further configured to query a user of the first computer to input the predetermined time threshold value.

10. The system of claim 8 wherein the second computer is configured to assign a first time stamp value to the first plurality of data sample values, the first time stamp value corresponding to the first predetermined time, the second computer further configured to assign a second time stamp value to the second plurality of data sample values, the second time stamp value corresponding to the second predetermined time.

11. The system of claim 10 wherein the first computer is further configured to determine the time difference value by subtracting the first time stamp value from the second time stamp value, the first computer further configured to generate a first graphical plot of the first plurality of data sample values on a computer monitor if the time difference value is less than the predetermined time threshold value, the first computer further configured to generate a second graphical plot of the second plurality of data sample values on the computer monitor if the time difference value is less than the predetermined time threshold value.

12. The system of claim 8 wherein the first computer is further configured to send a third data request message having the first identifier value to the second computer to retrieve a third plurality of data sample values previously stored in the second computer, the third plurality of data sample values based on the first signal generated by the first sensor from a fifth predetermined time to a sixth predetermined time;

the second computer further configured to send the third plurality of data sample values to the first computer in response to the third data request message;

the first computer further configured to send a fourth data request message having the second identifier value to the second computer to retrieve a fourth plurality of data sample values previously stored in the second computer, the fourth plurality of data sample values based on the second signal generated by the second sensor from a seventh predetermined time to an eighth predetermined time;

the second computer further configured to send the fourth plurality of data sample values to the first computer in response to the fourth data request message;

the first computer further configured to determine a time difference between the fifth predetermined time and the seventh predetermined time; and the first computer further configured to store both the third plurality of data sample values and the fourth plurality of data sample values in the first memory when the time difference between the fifth predetermined time and the sixth predetermined time is less than the predetermined time threshold value.

13. An article of manufacture, comprising:

a computer storage medium having a computer program encoded therein for obtaining data in a computer system, the computer storage medium including:

code for receiving first and second identifier values associated with the first and second sensors, respectively, from an input device operably coupled to a first computer;

code for sending a first data request message having the first identifier value from the first computer to a second computer to retrieve a first plurality of data sample values previously stored in the second computer, the first plurality of data sample values based on a first signal generated by a first sensor from a first predetermined time to a second predetermined time;

code for sending the first plurality of data sample values from the second computer to the first computer in response to the first data request message;

code for sending a second data request message having the second identifier value from the first computer to the second computer to retrieve a second plurality of data sample values previously stored in the second computer, the second plurality of data sample values based on a second signal generated by a second sensor from a third predetermined time to a fourth predetermined time;

code for sending the second plurality of data sample values from the second computer to the first computer in response to the second data request message;

code for determining a time difference between the first predetermined time and the third predetermined time; and code for storing both the first plurality of data sample values and the second plurality of data sample values in a first memory of the first computer when the time difference between the first predetermined time and the third predetermined time is less than a predetermined time threshold value.

14. The article of manufacture of claim 13 wherein the computer storage medium further comprises code for displaying both the first plurality of data sample values and the second plurality of data sample values on a computer monitor when the time difference between the first predetermined time and the third predetermined time is less than the predetermined time threshold value.

* * * * *